United States Patent
Garcia (10) Patent No.: US 12,123,544 B2
(45) Date of Patent: Oct. 22, 2024

(54) POST AND RAIL

(71) Applicant: Jordan Garcia, Leawood, KS (US)

(72) Inventor: Jordan Garcia, Leawood, KS (US)

(73) Assignee: TIFEC, LLC, Leawood, KS (US)

( * ) Notice: Subject to any disclaimer, the term of this patent is extended or adjusted under 35 U.S.C. 154(b) by 114 days.

(21) Appl. No.: 17/836,877

(22) Filed: Jun. 9, 2022

(65) Prior Publication Data

US 2022/0397236 A1 Dec. 15, 2022

Related U.S. Application Data

(60) Provisional application No. 63/208,583, filed on Jun. 9, 2021.

(51) Int. Cl.
| *F16M 13/00* | (2006.01) |
| *F16M 13/02* | (2006.01) |
| *G09F 7/18* | (2006.01) |

(52) U.S. Cl.
CPC ............. *F16M 13/022* (2013.01); *G09F 7/18* (2013.01); *G09F 2007/1834* (2013.01)

(58) Field of Classification Search
CPC ........ F16M 13/022; F16M 13/02; G09F 7/18; G09F 2007/1834; G09F 7/08; G09F 7/20
See application file for complete search history.

(56) References Cited

U.S. PATENT DOCUMENTS

| 5,617,698 | A | * | 4/1997 | Guilmette | ........... | E04F 21/1844 |
| | | | | | | 52/749.1 |
| 9,637,931 | B2 | * | 5/2017 | Hart | ..................... | E04H 17/1448 |
| 11,457,735 | B1 | * | 10/2022 | D'Isep | ................. | A47B 57/045 |
| 2006/0254190 | A1 | * | 11/2006 | Hunt | ..................... | F16M 13/02 |
| | | | | | | 52/698 |
| 2009/0056186 | A1 | * | 3/2009 | Pitcher | ..................... | G09F 7/22 |
| | | | | | | 29/700 |
| 2011/0099866 | A1 | * | 5/2011 | Pitcher | ..................... | G09F 7/20 |
| | | | | | | 40/611.01 |
| 2011/0101191 | A1 | * | 5/2011 | Suciu | ........................ | G09F 7/18 |
| | | | | | | 248/342 |
| 2014/0263890 | A1 | * | 9/2014 | McCarthy | .............. | F16M 13/02 |
| | | | | | | 29/428 |
| 2015/0048224 | A1 | * | 2/2015 | Patterson | ............. | F16M 13/022 |
| | | | | | | 248/200.1 |
| 2019/0063665 | A1 | * | 2/2019 | LeCote | .................. | F16M 13/02 |

* cited by examiner

*Primary Examiner* — Amy J. Sterling
(74) *Attorney, Agent, or Firm* — Kutak Rock LLP (57) ABSTRACT

A post and rail assembly is provided. The assembly includes a lower element coupled to an upper element. The upper element is integrated or otherwise affixed to a surface of a room, typically a ceiling. The upper element includes a plurality of receiving components to selectively receive and retain a portion of the lower element. The lower element is secured to the upper element by coupling with said receiving elements and adjusting for a friction fit with a second surface, typically the ground. The lower element includes mounting components, the mounting components configured to receive one or more item. Multiple lower elements are utilized to support larger or heavier items. The lower elements are preferentially positioned at fixed points along the length of the upper element.

18 Claims, 14 Drawing Sheets

POST AND RAIL

CROSS-REFERENCE TO RELATED APPLICATIONS

This application claims priority pursuant to 35 U.S.C. 119(e) to co-pending U.S. Provisional Patent Application Ser. No. 63/208,583, filed Jun. 9, 2021, the entire disclosure of which is incorporated herein by reference.

FIELD OF THE INVENTION

The present invention relates generally to mounting systems. More specifically, the present invention is concerned with installed mounting systems for non-destructive, configurable, customizable display of items.

BACKGROUND

Wall fixtures and wall displays are a cornerstone of both residential and business environments. Artwork, pictures, whiteboards, televisions, and similar items are oftentimes mounted to walls directly, requiring the item or a mounting bracket for the item to be affixed directly to the wall, oftentimes damaging paint. This mounting is permanent to the extent that to move the item, a new mount will need to be established on a new wall, further damaging that wall while leaving behind the hardware or damage to the previous surface that the item was positioned on. Moreover, oftentimes the mounting solution for one item, such as artwork, cannot be utilized for another item, such as a television. Furthermore, oftentimes for aesthetic reasons a space needs to be rapidly customizable for wall fixtures, which no time to remedy damage rendered by existing or previous wall fixtures. Therefore it would be advantageous to provide a mounting system which was non-destructive for walls, allows for customization and configuration regarding positioning of items, and is compatible with many items of varying size and weight.

SUMMARY

The present invention comprises a post and rail system and method for securing an item. The assembly includes a lower element coupled to an upper element. The upper element is integrated or otherwise affixed to a surface of a room, typically a ceiling. The upper element includes a plurality of receiving components to selectively receive and retain a portion of the lower element. The lower element is secured to the upper element by coupling with said receiving elements and adjusting for a friction fit with a second surface, typically the ground. The lower element includes mounting components, the mounting components configured to receive one or more item. Multiple lower elements are utilized to support larger or heavier items. The lower elements are preferentially positioned at fixed points along the length of the upper element. This configuration provides for near-wall mounting of items without being destructive of wall surfaces. Furthermore, the assembly is highly customizable, as lower elements are postionable along a length of the upper element and items are height adjustable along the height of the lower elements. Additionally, the assembly is compatible with a multitude of mounting systems and apparatus, allowing for a high degree to space customization and rapid transformation of work and living spaces without worry of remedying damage from prior mounting.

The foregoing and other objects are intended to be illustrative of the invention and are not meant in a limiting sense. Many possible embodiments of the invention may be made and will be readily evident upon a study of the following specification and accompanying drawings comprising a part thereof. Various features and subcombinations of invention may be employed without reference to other features and subcombinations. Other objects and advantages of this invention will become apparent from the following description taken in connection with the accompanying drawings, wherein is set forth by way of illustration and example, an embodiment of this invention and various features thereof.

BRIEF DESCRIPTION

A preferred embodiment of the invention, illustrative of the best mode in which the applicant has contemplated applying the principles, is set forth in the following description and is shown in the drawings and is particularly and distinctly pointed out and set forth in the appended claims.

DETAILED DESCRIPTION

As required, a detailed embodiment of the present invention is disclosed herein; however, it is to be understood that the disclosed embodiment is merely exemplary of the principles of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring generally to FIGS. 1-4, in some embodiments, a post and rail assembly is provided. The post and rail assembly includes an upper element 100, such as a rail, and a lower element 200, such as a post. The upper element 100 is, in some embodiments, selectively coupled to the lower element 200, or the lower element 200 is selectively coupled to the upper element 100. In some embodiments, the upper element 100 is positioned and/or secured to a surface, such as a ceiling or a wall. In such a configuration, the upper element 100, when coupled to the lower element 200, secures the lower element 200 in a fixed orientation. In some embodiments, the upper element 100 is secured to a ceiling of a room, and the lower element 200 is coupled to the upper element 100. In such embodiments, the upper element 100 secures the lower element 200 in a vertical orientation. In some embodiments, the upper element 100 restricts the lower element 200 about at least one of the six degrees of freedom, the degrees of freedom being the three translational envelopes [moving forward and backwards on the x-axis (surge); moving left and right on the y-axis (sway); moving up and down on the z-axis (heave)] and the three rotational envelopes [tilting to the side on the x-axis (roll); tilting forward and backwards on the y-axis (pitch); turning left and right on the z-axis (yaw)]. In some embodiments, the upper element 100 restricts the lower element 200 in any combination of a plurality of the six degrees of freedom.

The post and rail assembly is configured to selectively secure one or more item and/or object 10 for display. The upper element 100 and/or the lower element 200, or both, are configured with receiving elements, such as receiving elements 210 to selectively secure the item 10 in an orientation. Such securing of the item 10 allows for the item to be displayed in a certain location within the room at a desired height. The assembly includes receiving elements 210 positioned along the lengths of the upper and lower elements, such that the assembly allows for a wide variety of orientations and positions for the secured item 10 to be located, allowing a single item 10 to be displayed at multiple viewing angles and allowing for rapid customization of room or space.

In some embodiments, the assembly includes an upper element 100. In some embodiments, the upper element 100 is a rail. In some embodiments, the rail has a substantially greater length than width. The upper element 100, in some embodiments, is an elongated rail. Generally, the upper element 100 is associated with, integrated within, or otherwise secured to a surface or wall. In some embodiments, the surface is a ceiling. In some embodiments, the upper element 100 is configured to selectively receive or include one or more additional element or section. In some embodiments, the additional element is received in a channel (or track) 110 of the upper element 100. In some embodiments, the additional element is a lower or vertical element 200 of the assembly. In some embodiments, the upper element 100 secures the vertical element 200 in an orientation, such that the vertical element 200 is restricted along at least one degree of freedom. In some embodiments, the vertical element 200 is restricted along two, three, four, five, or all six degrees of freedom.

Figure 4A:
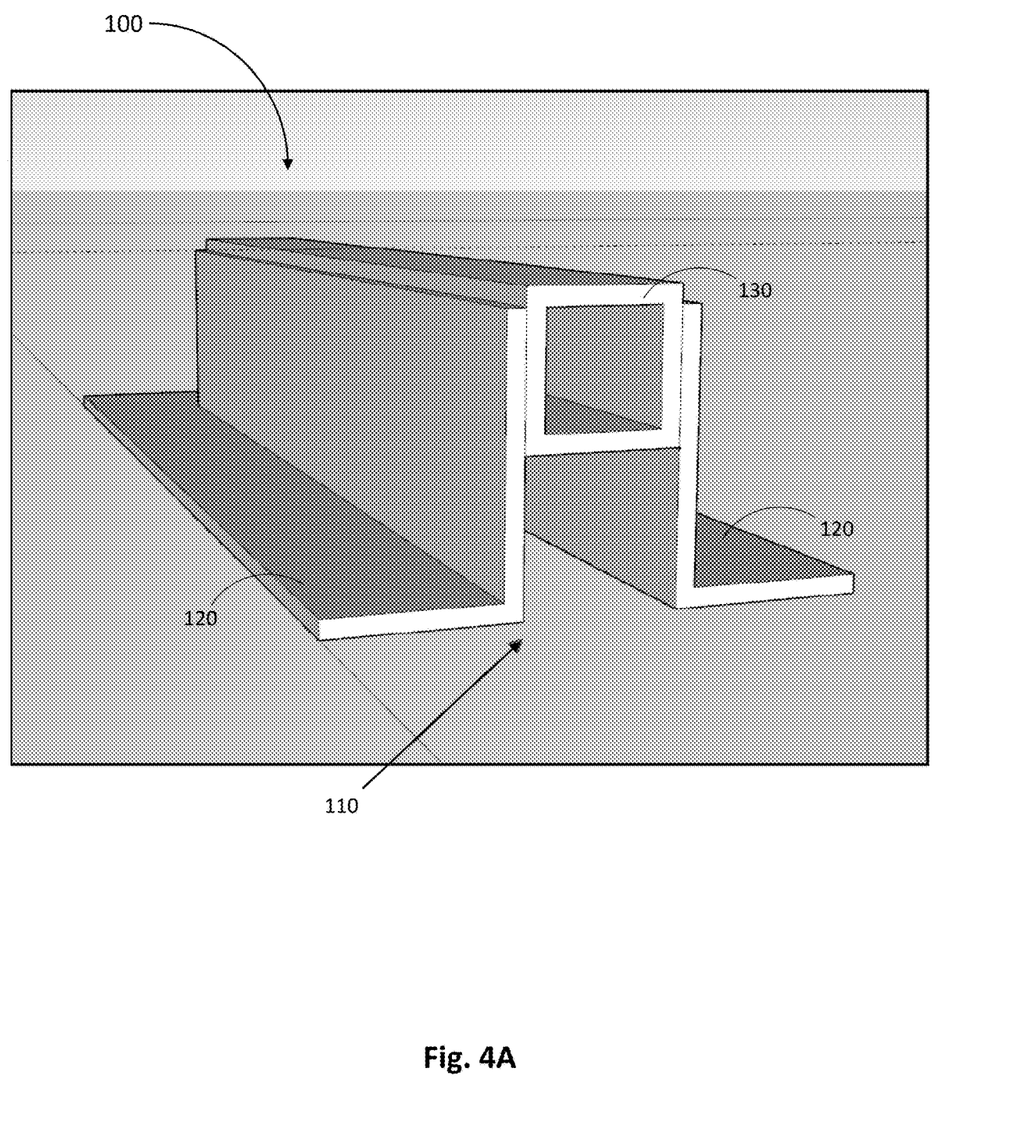
FIGS. 4A and 4B are perspective and bottom perspective views of an upper element.
Figure 4B:
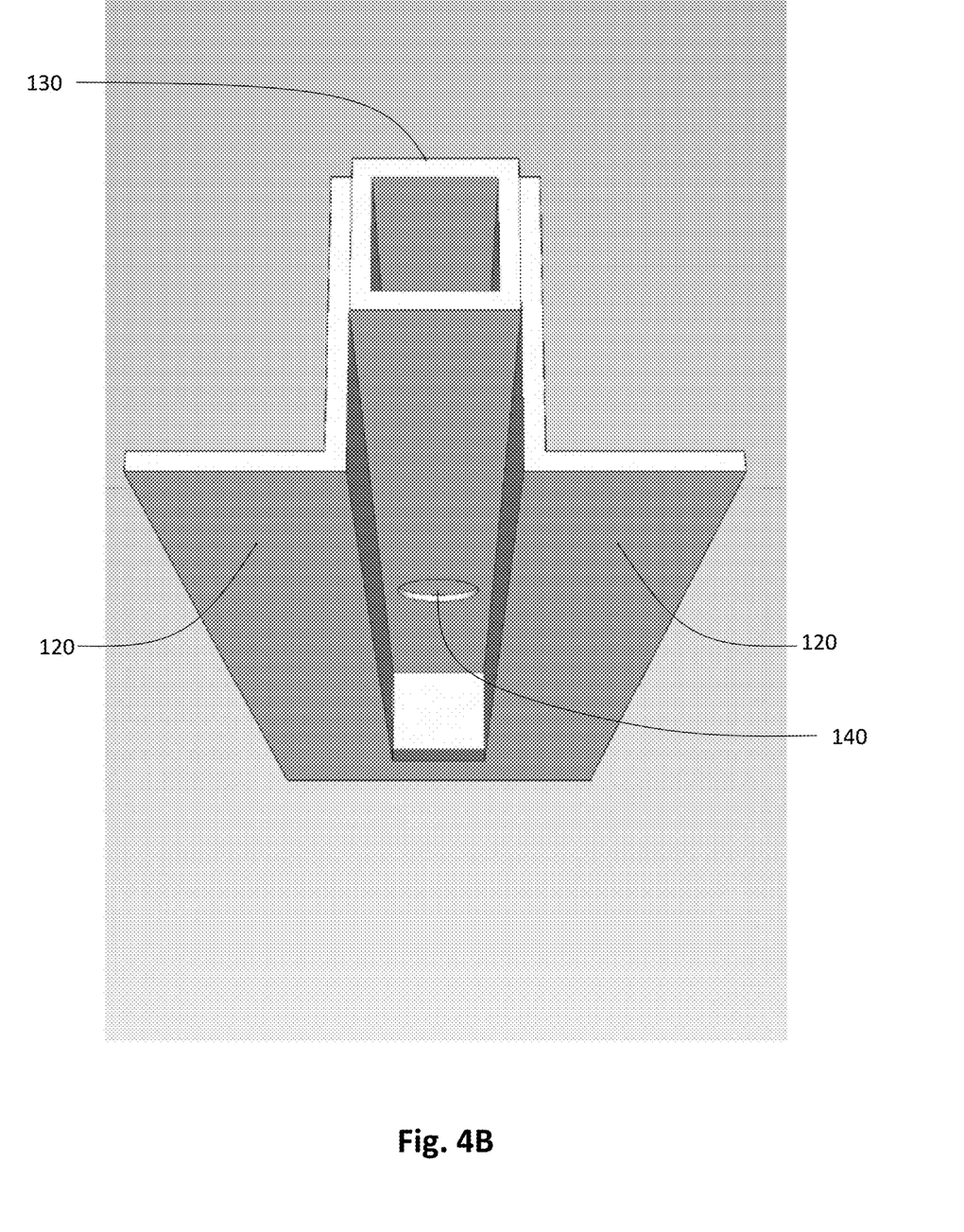

Referring to FIGS. 4A-B, the upper element includes one or more elongated, lengthwise component. In some embodiments, the lengthwise component is one or more wing component 120, where in some embodiments two wing components 120 are utilized in an orientation mirrored about at least one axis. In some embodiments, the wing component 120 has a vertical member and a horizontal member. In some embodiments, the vertical member has an upper lengthwise edge and a lower lengthwise edge while the horizontal member has an inner lengthwise edge and an outer lengthwise edge. In some embodiments, the members joined along a lengthwise edge at an angle. In some embodiments, the lower lengthwise edge of the vertical member is joined to the inner lengthwise edge of the horizontal member. Said angle is 90 degrees in a preferred embodiment, but it will be appreciated that the angle is advantageously more or less than 90 degrees given the requirements at the time of installation. In some embodiments, the horizonal and vertical components are formed from a single piece of material, such that the material has been bent, molded, or otherwise formed to the advantageous angle, the angle defining the respective joined edges of the vertical and horizontal components.

ise, the opposing, mirrored wing components 120 are positioned proximate one other while substantially mirroring one another an axis, such that the vertical members are parallel with a gap or space between them while the horizontal members extend from a bottom surface of the vertical members in opposite directions, thus creating a channel 110 along the length of the wing elements 120. In some embodiments, said channel 100 is configured to receive a portion of a lower element and/or a vertical element 200 of said assembly. In some embodiments, such configuration is by way of spacing the vertical components of the wing components 120 to accommodate for a portion of a lower element 200.

Figure 1:
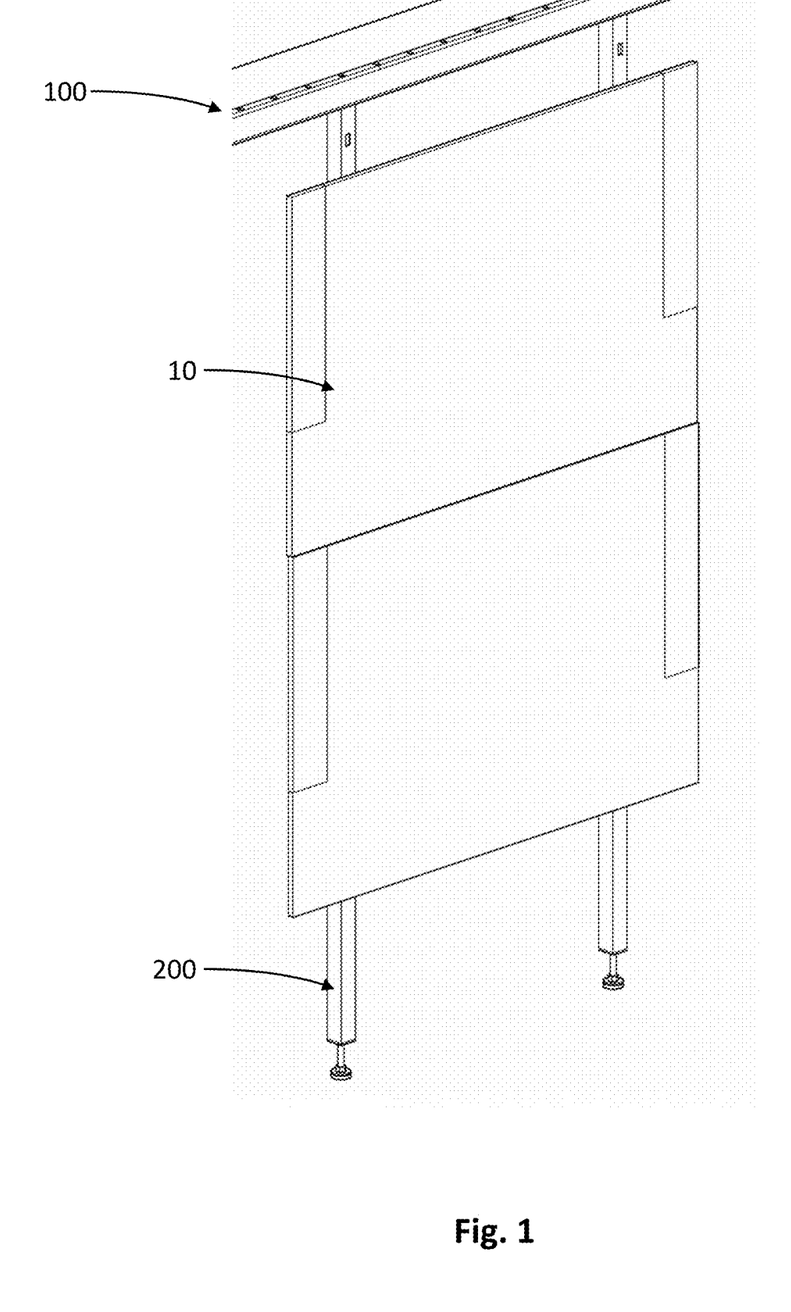
FIG. 1 is a perspective view of a post and rail assemble according to some embodiments of the present invention.
Figure 2:
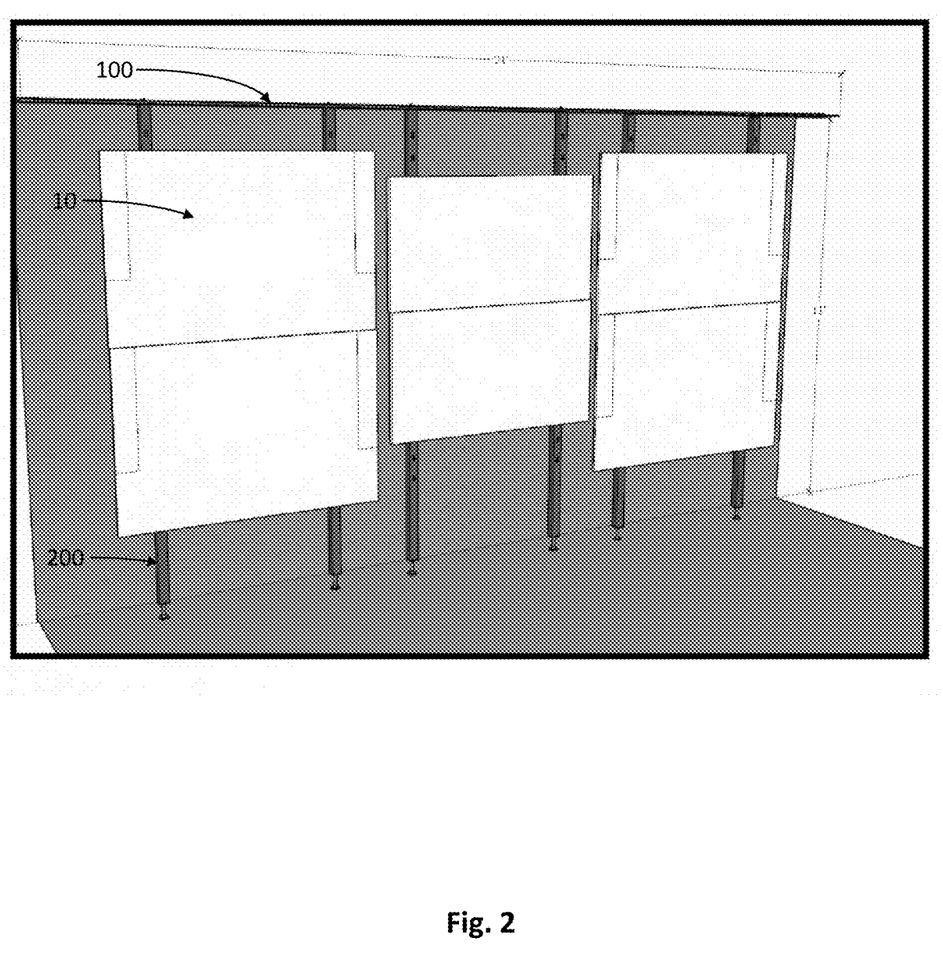
FIG. 2 is a rendering of items secured to a post and rail assembly according to some embodiment of the present invention.
Figure 3A:
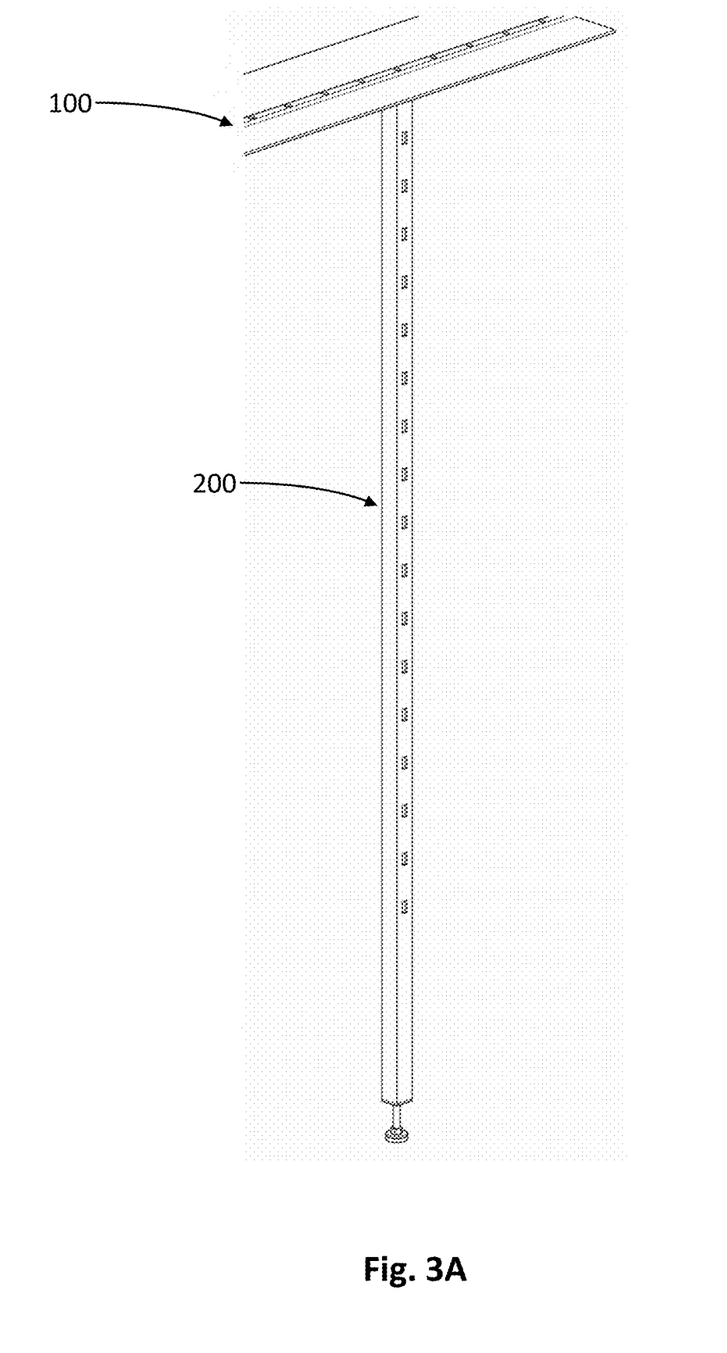
FIG. 3A-C are perspective, front, and side views, respectively, of a post and rail assembly according to some embodiment of the present invention.
Figure 3B:
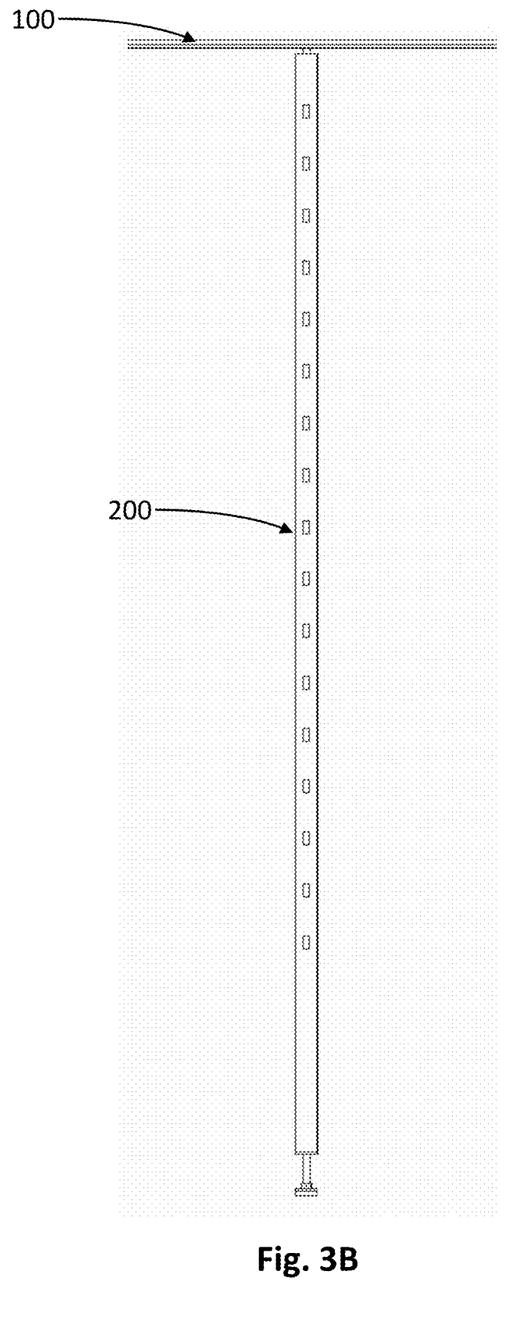
Figure 3C:
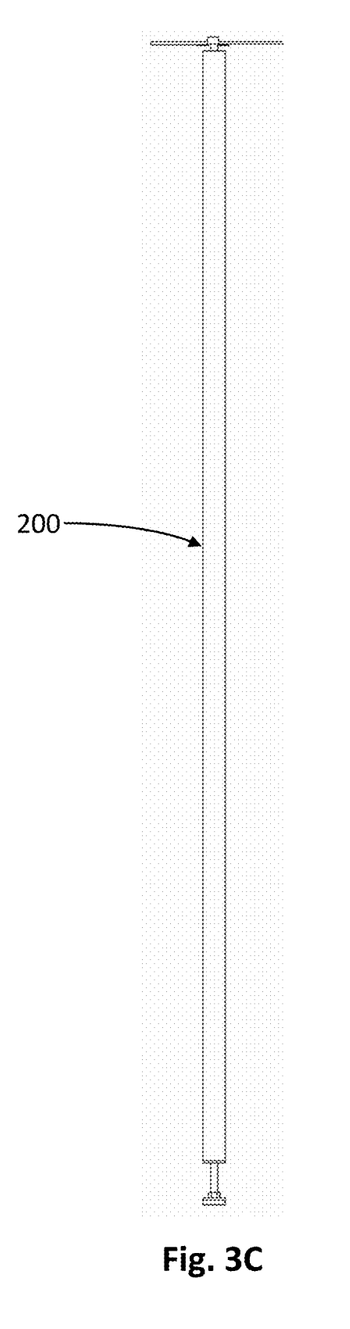

In some embodiments, another lengthwise component is a base component 130. In some embodiments, the base component 130 is flanked by opposing first and second wing components 120, such as those shown in FIG. 3. In some embodiments, the base component 130 is positioned towards a perimeter of the channel 110 defined by opposing wing components 120. In some embodiments, the base component 130 further defines a base of the channel 110. In some embodiments, the base component 130 is secured to an upper portion and/or edge of the vertical members of one or more wing component 120, thus the base component 130 and wing components 120 define a channel 110 with opposing sides and a base. In some embodiments, the base component 130 is a solid element, while in other embodiments the base component 130 comprises a structural geometry, such as a square with hollow core as depicted in FIGS. 3 and 4. It will be appreciated that other geometries are advantageous depending on the conditions, demands, and desires associated with the particular applications of the assembly.

In some embodiments, the base component 130 includes one or more receiving element 140, such as a hole, clip, or the like. In some embodiments, the receiving element 140 is positioned along a centerline of the portion of the base component 130 which defines the base of the channel 110. In some embodiments, a plurality of spaced receiving elements 140 are utilized, positioned along the length of the channel 110. In some embodiments, the spacing is consistent between receiving elements 140, while in other embodiments the spacing is inconsistent to accommodate for particular applications of the assembly relative to a working space. In some embodiments, the receiving element 140 is configured to receive a portion of a lower element 200 and/or post element of the assembly.

Figure 5:
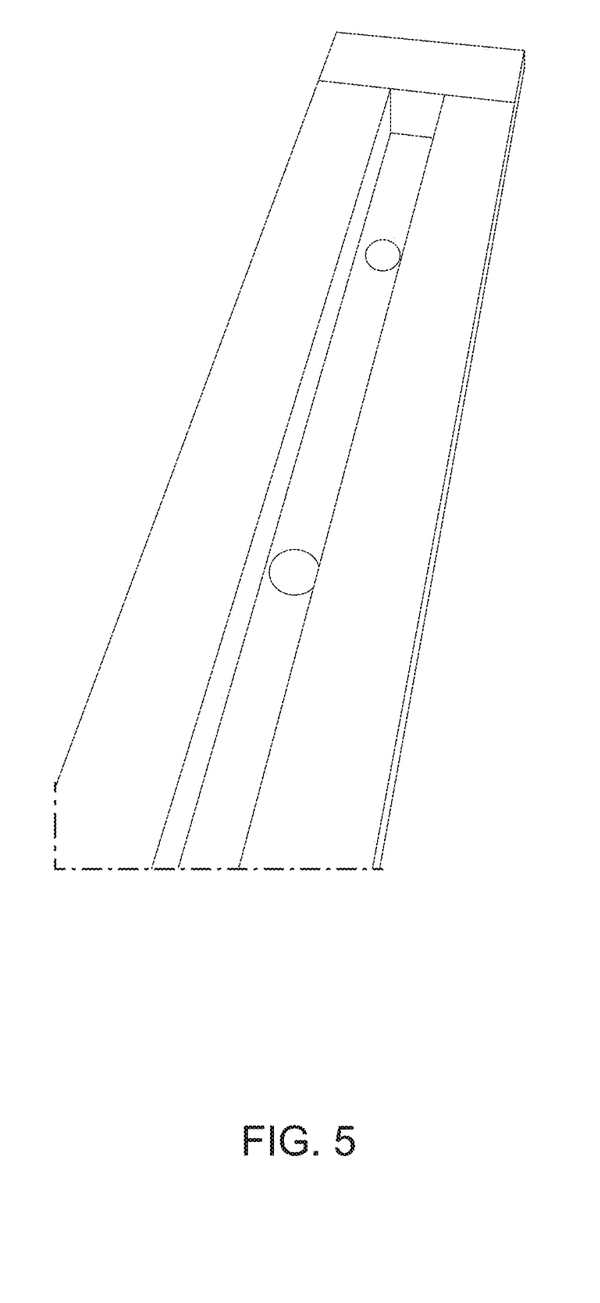
FIG. 5 is a depiction of an upper element with an endcap according to one embodiment of the present invention.

Referring to FIG. 5, in some embodiments, the upper element 100 includes one or more endcap component. In some embodiments, the endcap component is positioned at an end of the channel 110 and/or wing components 120 and/or base component 130. In some embodiments, the endcap at least partially defines an end of the channel 110. In some configurations of the assembly, the channel 110 does not include an endcap and the channel 110 truncates upon reaching the end of the length of the components of the upper element 100.

Figure 6:
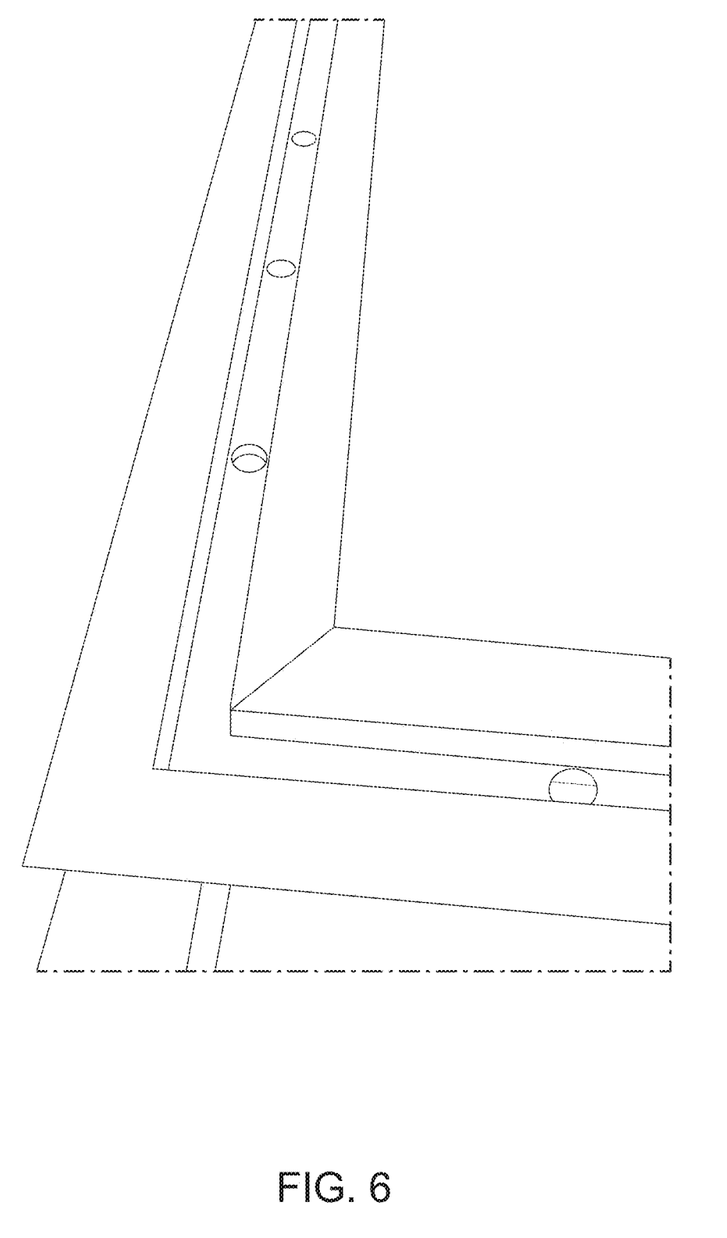
FIG. 6 is a depiction of a plurality of joined, unmounted upper elements according to one embodiment of the present invention.
Figure 7:
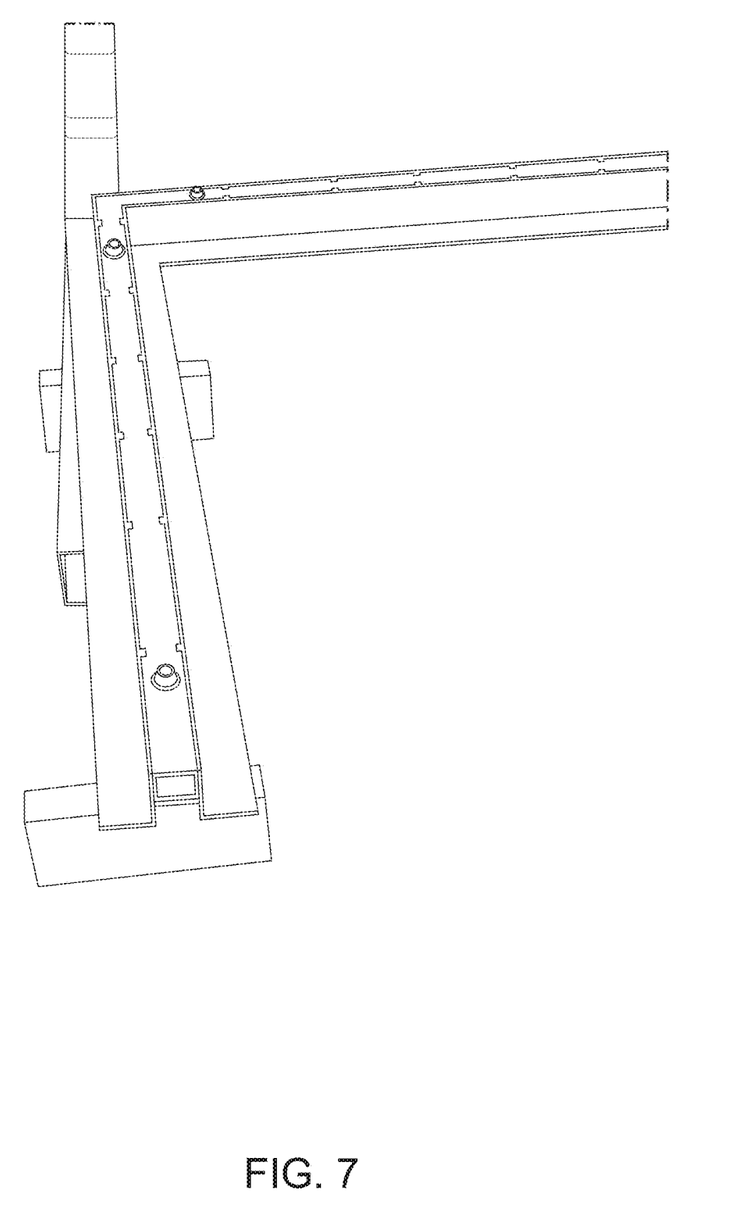
FIG. 7 is a depiction of a plurality of joined, unmounted upper elements according to one embodiment of the present invention.
Figure 8:
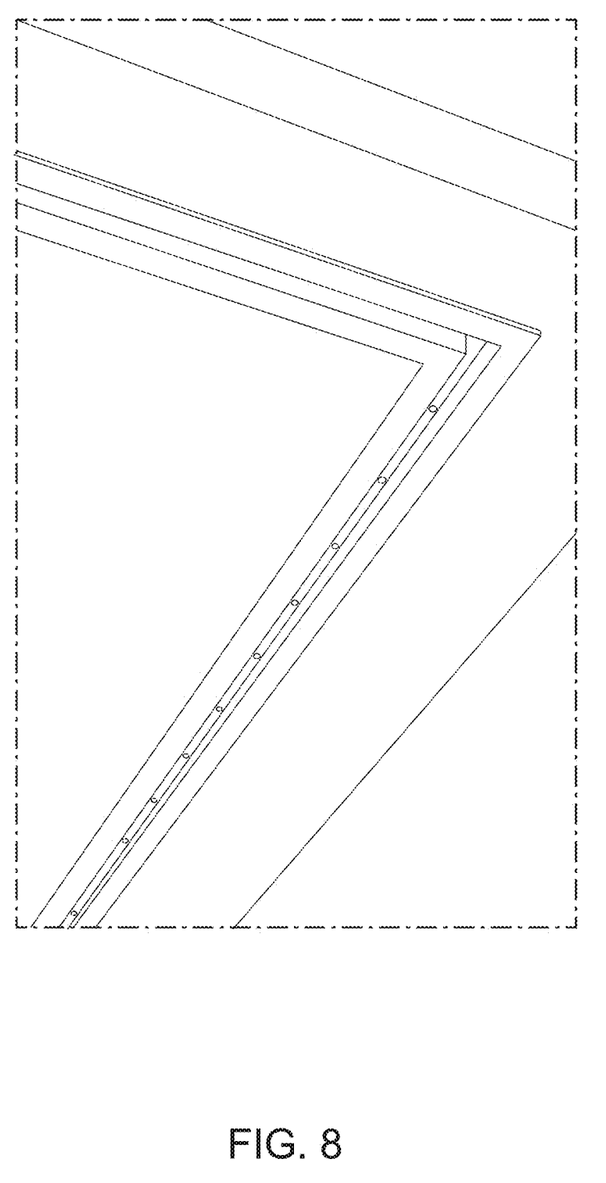
FIG. 8 is a depiction of a plurality of joined, mounted upper elements according to one embodiment of the present invention.

Referring generally to FIGS. 6-8, the upper elements 100 generally form straight, continuous channels. In some embodiments one or more upper element can be positioned sequentially to form additional geometries, such as the angle shown in FIG. 6. It will be appreciated that other angles and geometries are provided by altering the angle at which the two upper elements meet. In some embodiments, a plurality of upper elements are positionable within a room such that they form a continuous track and/or channel in a portion of a surface of a room, such as the ceiling. This concept is partially demonstrated in FIGS. 8-10. In some embodiments, the upper elements 100 include curved lengths, which results in curved continuous channels 100.

Figure 9:
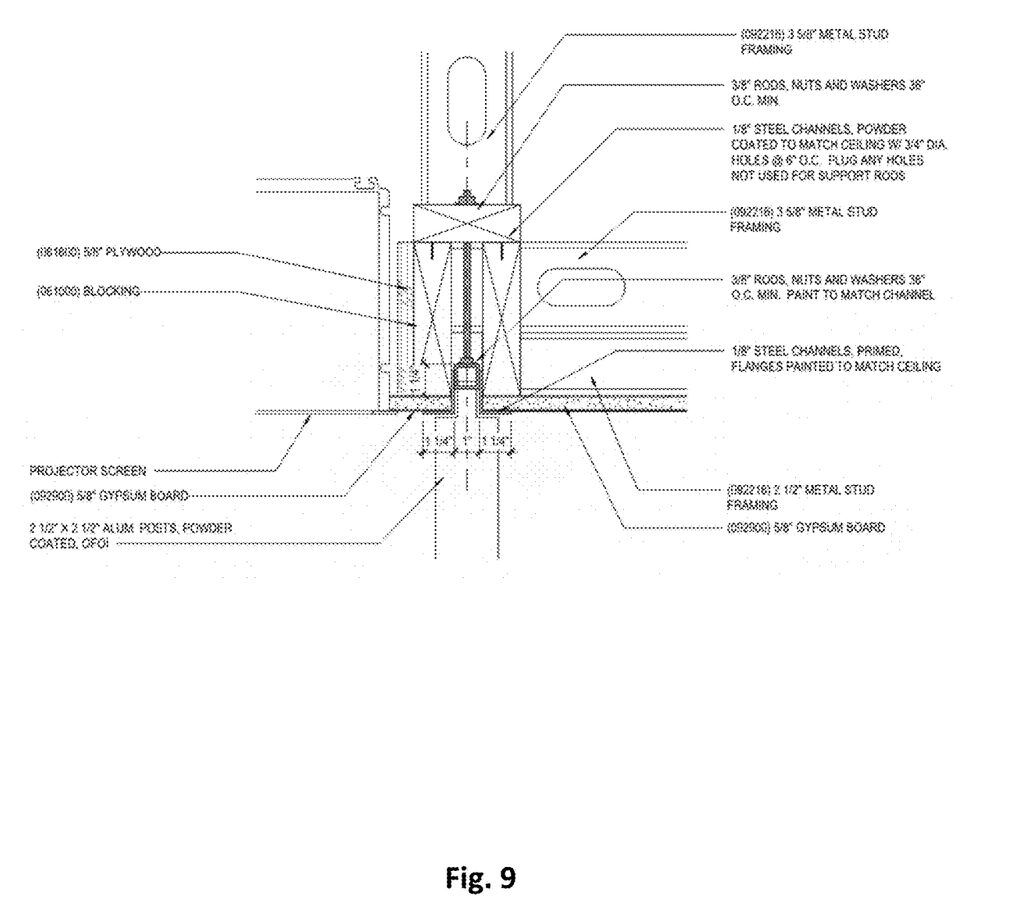
FIG. 9 is a schematic view of an installation configuration of an upper element.
Figure 10A:
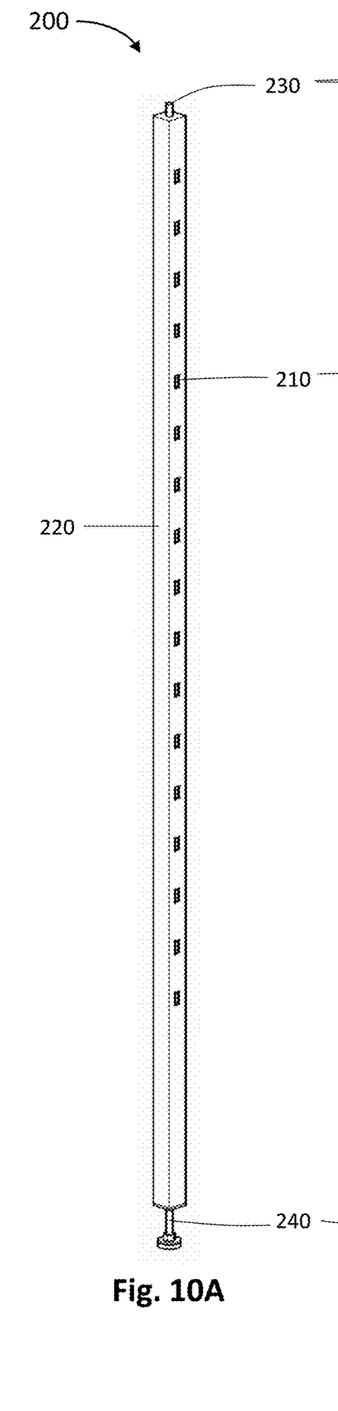
FIGS. 10A-E are perspective, front, side, top and bottom views, respectively, of a lower element.
Figure 10B:
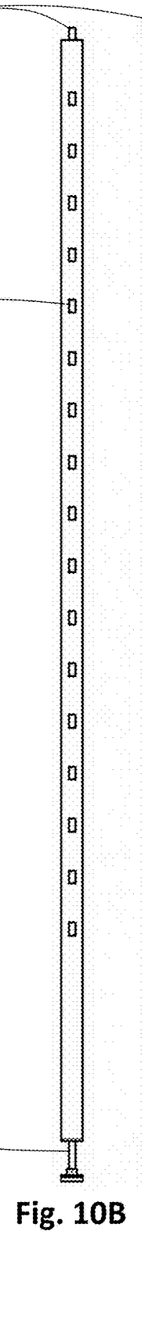
Figures 10C, 10D, 10E:
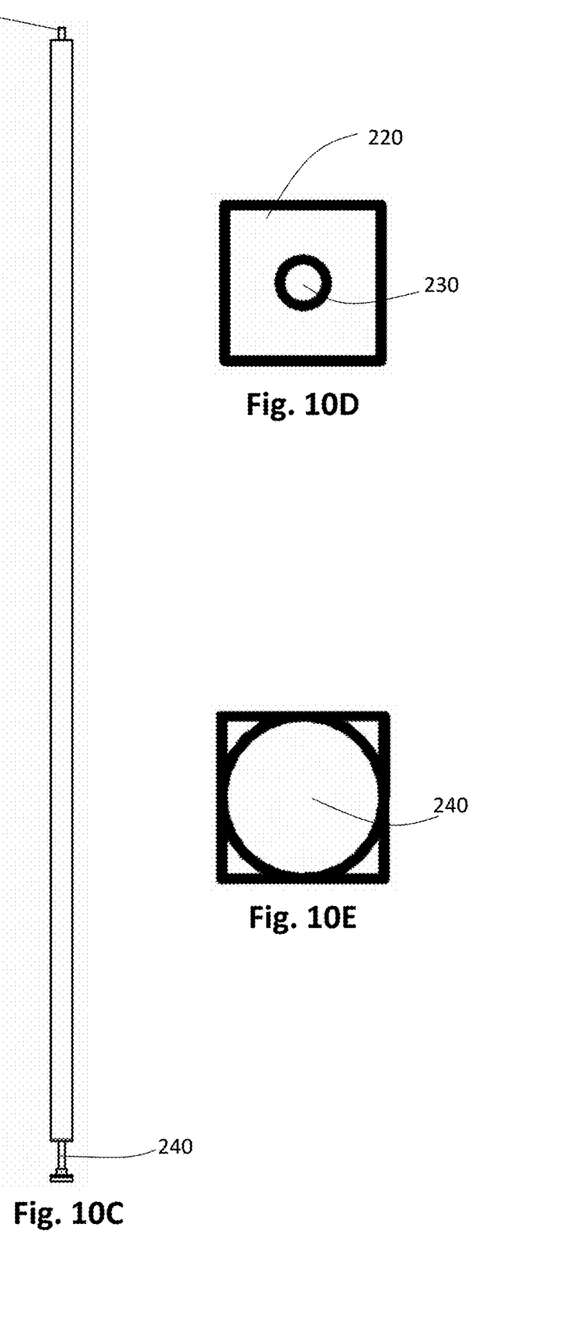

Referring to FIG. 9, the upper element in some embodiments, is integrated within one or more structure, wall, and/or ceiling. In some embodiments, the upper element is integrated within a building, such that the upper element is positioned within an existing structure, wall, ceiling, and/or other support structure of a building. In some embodiments, the upper element is integrated within a structure that is being constructed. In some embodiments, the upper element is secured to or integrated with the structure by brackets or other suitable means. In some embodiments, the upper element is integrated with the structure and is concealed from view.

FIG. 9 provides details as to such an integration of the upper element according to some embodiments of the present invention. The specific structural materials denoted within FIG. 9 demonstrate a preferred embodiment, but it will be appreciated that various implementations and integrations are contemplated for the upper element.

Referring to FIGS. 10A-E, in some embodiments, the assembly includes one or more lower element 200 (also called a post element, or vertical element). In some embodiments, the lower element 200 includes a main body 220. The main body comprises an elongate structure which in some embodiments if formed of rigid material, such as metal, hardened plastic, or the like. The main body includes a top portion, a bottom portion, and a receiving portion. The receiving portion, in some embodiments, includes one or more mounting elements and/or receiving elements 210. It will be appreciated that the terms 'mounting elements' and 'receiving elements' are interchangeable in the description without deviating from the spirit of the invention. In some embodiments, the mounting elements 210 are positioned along a centerline of the receiving portion and are configured to receive one or more item, apparatus, or attachment element. In some embodiments, the mounting element 210 receives an item or apparatus and subsequently bears, alone or in conjunction with one or more other mounting element 210, the entire weight of said item or apparatus, either individually or shared between one or more other lower element. In some embodiments, a plurality of mounting elements 210 are utilized to secure an item or apparatus and/or attachment element. In some embodiments, such securing restricts the item or apparatus in at least one degree of freedom. In some embodiments, where multiple mounting elements are utilized, the mounting elements are positioned with consistent spacing. In some embodiments, the spacing is 6" off center, while in other embodiments the spacing is more or less depending on the needs to the particular application of the assembly. It will be appreciated that a plurality of posts with similar spacing and configurations of mounting elements are to be utilized in some embodiments, while in other posts with varied configurations are utilized.

In some embodiments, the upper portion of the lower element includes or is affixed to a coupling component 230. In some embodiments, the coupling component 230 is configured to couple or otherwise be received by a receiving element 140 of an upper element 100 of the assembly, thereby securing the lower element 200 to the upper element 100 of the assembly. In some embodiments, this securing restricts the lower element in at least one degree of freedom, while in some embodiments the securing restricts the lower element in all three translational envelops and at least one rotational envelope. In some embodiments, the coupling component 230 is configured such as to be received by any one of a plurality of receiving elements 140 associated with the upper element of the assembly. In some embodiments, the coupling component 230 is a screw mounted to the upper portion of the lower element of the assembly, while in other embodiments the coupling component is a clip, flap, linkage, or the like.

In some embodiments, a bottom portion of the lower element includes or is affixed to an adjustment component 240. In some embodiments, the adjustment component 240 is configured to selectively adjust the overall length of the lower element 200 by adjusting the adjustment component 240 between retracted and extended configurations. In some embodiments, the adjustment component 240 is initially configured in a retracted configuration, such that the length of the lower element is at its shortest. In some embodiments, the adjustment component is configured in an extended configuration, such that the length of the lower element is longer than its shortest length. In some embodiments, where the lower element is coupled to an upper element, the adjustment component is engaged and moved from a retracted to an extended configuration, thereby extending the length of the lower element. In some embodiments, the length is extended until a footing of the adjustment component contacts the ground, thereby creating a friction fit of the lower element between the upper element and the ground. In some embodiments, such friction fit further restricts the lower element in at least one degree of freedom.

Figure 11:
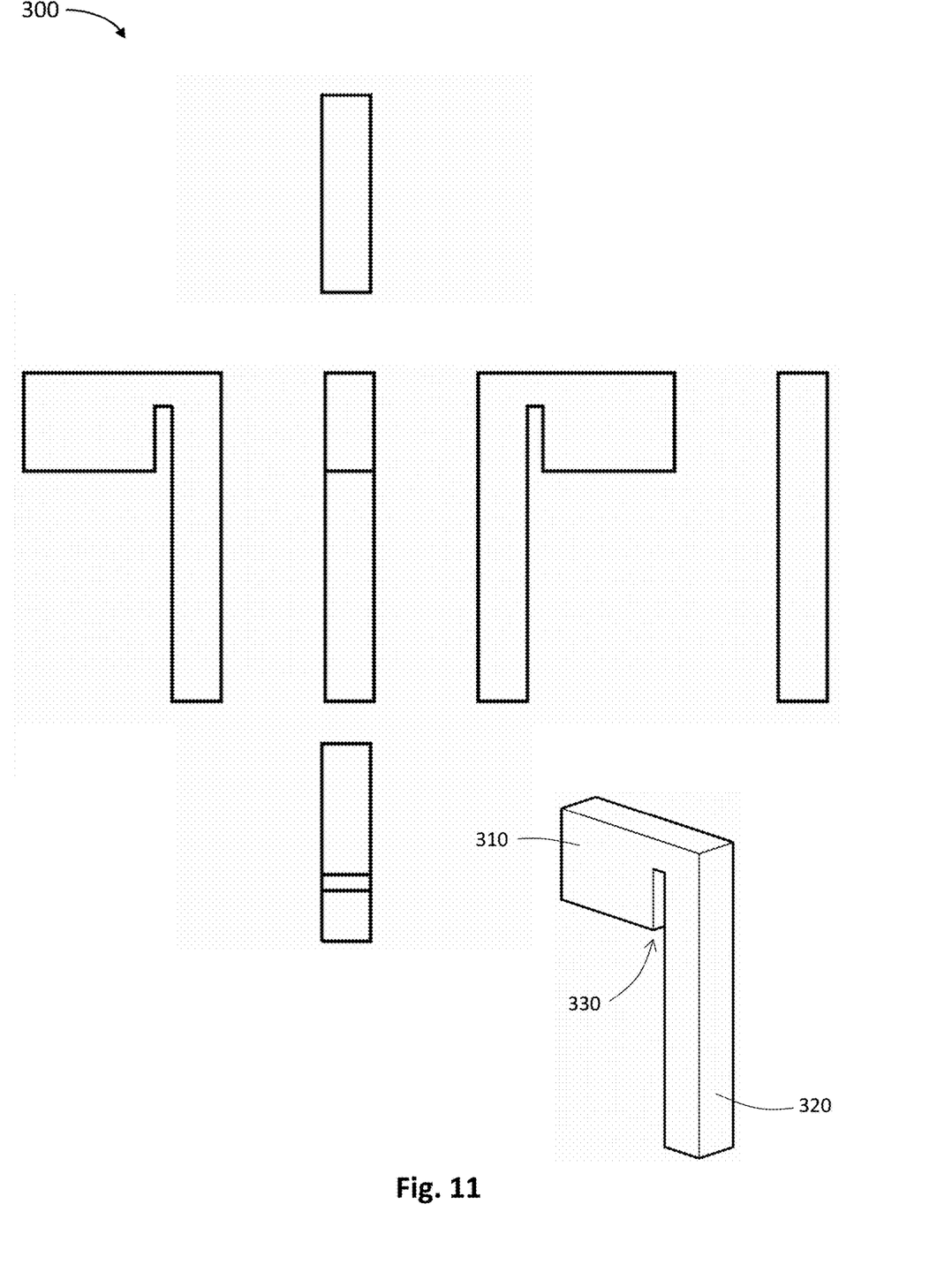
FIG. 11 depicts perspective, front, rear, left, right, top, and bottom view of an attachment element according to some embodiments of the present invention.

In some embodiments, one or more attachment element is included. An embodiment of the attachment element is depicted in FIG. 11. In some embodiments, the attachment element includes a first portion 310 (sometimes referred to a key portion) and a second portion 320 (sometimes referred to as a main body portion). The first portion and the second portion are connected by way of an intermediate portion and sized such that a slot 330 is formed between first portion 210 and second portion 320. The first portion 310 is configured to be received by one or more mounting elements 210, such that the first portion 310 fits partially or entirely within the mounting element 210. A wall of the lower element is then positionable within the slot 330 as the first portion is within mounting element 210, such that in some embodiments the first portion slides downwards within he mounting element 210 until a wall of the lower element 200 contacts the intermediary portion of the attachment element, thereby securing the attachment element to the lower elements. The second portion of the attachment element is secured to or otherwise integrated and/or interfaced with an object or item 10 intended for display. In some embodiments, the second portion of the attachment element is configured to be coupled to an object. In some embodiments, the attachment elements are integrally formed with the object. In some embodiments, the attachment elements are removably coupled to the object. In some embodiments, the attachment elements are made of metal. In some embodiments, the attachment elements are made of plastic. In some embodiments, the attachment elements are equally spaced from one another along the length of the object. In some embodiments, the attachment elements are spaced such that adjacent attachment elements are not spaced the same distance apart from one another. The attachment element are configured such that they substantially align with one or more mounting elements.

It will be appreciated that other embodiments of the attachment element which are different from those shown in FIG. 11 are contemplated. For example, in some embodiments, the attachment elements are hooks, while in other embodiments the attachment elements are screws, loops, barbs, velcro, adhesives, or the like. In some embodiments, the mounting elements are configured to releasably couple to the attachment elements. In some embodiments, the mounting elements are configured to couple to the attachment elements such that the attachment elements are removable from the mounting elements. In some embodiments, the mounting elements are configured to receive the attachment elements in a snap-fit manner. In some embodiments, the mounting elements are configured to receive the attachment elements in a press-fit manner. In some embodiments, the mounting elements are configured to receive the attachment elements in a friction-fit manner. In some embodiments, the mounting elements are equally spaced from one another along the length of the vertical member. In some embodiments, the mounting elements are spaced such that adjacent mounting elements are not spaced the same distance apart from one another. In some embodiments, the mounting elements extend outward from an outer surface of the vertical member. In some embodiments, the mounting elements extend inward from an outer surface of the vertical member. In some embodiments, the mounting elements are spaced such that the attachment elements cannot pass through the mounting elements. In some embodiments, the mounting elements are spaced such that the attachment elements can pass through the mounting elements. In some embodiments, the vertical member includes a top end and a bottom end, and the mounting elements are positioned near the bottom end of the vertical member. In some embodiments, the vertical member includes a top end and a bottom end, and the mounting elements are positioned near the top end of the vertical member. In some embodiments, the mounting elements are arranged in a single row along the length of the vertical member. In some embodiments, the mounting elements are arranged in multiple rows along the length of the vertical member.

Figure 12:
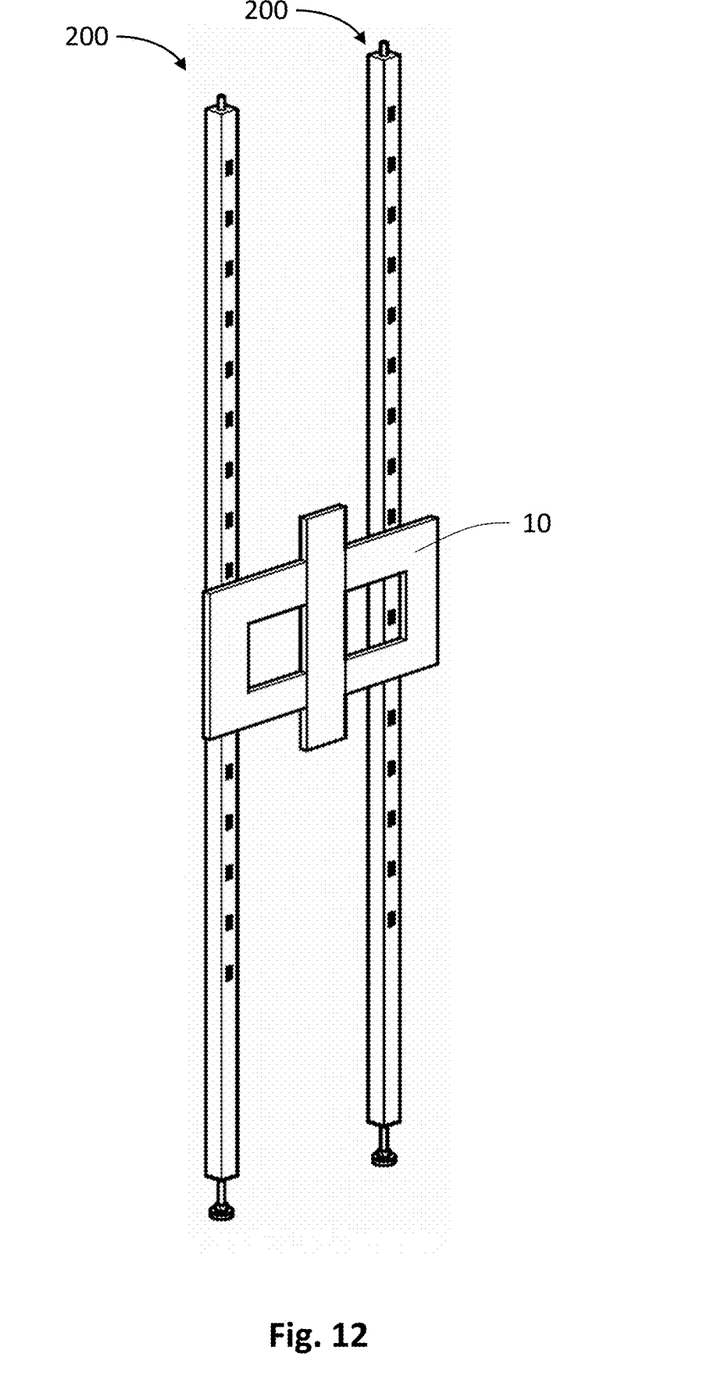
FIG. 12 depicts a post and rail assemble according to some embodiments of the present invention.

In some embodiments, the assembly is utilized to secure and/or display one or more item or assembly, such as shown in FIG. 12. With the assembly in place, an item is secured to the mounting components of at least one lower element. In some embodiments, multiple lower elements and one or more mounting component of each lower element is utilized to secure the item, such as shown in FIG. 12. In some embodiments, one or more lower element is configured to support multiple items. Due to the interchangeable nature of the vertical elements and receiving components of the upper elements, the vertical elements are configurable with varied spacing and positionable along an entire length of an upper assembly, enabling wall or near-wall mounted items to be displayed in multiple positions and orientations along the assembly. In some embodiments, the item coupled to the assembly is itself another mount, which further mounts an additional item, such as a TV. In this way, items, displays, electronics, and the like are positionable around a room without damaging existing walls by affixing the various items directly to the wall.

A method for securing an item for display is contemplated. In some embodiments, the method includes installing or securing an upper element to a surface of a room, such as a ceiling. In some embodiments, the method then includes securing or coupling a portion of at least one lower element to said upper element. In some embodiments, multiple lower elements are utilized to accommodate for the weight, size, and other attributes of the item for display. In some embodiments, once the lower element is coupled to the upper element, an adjustment element is engaged to move the lower element from a retracted to an extended configuration. Such movement extends a foot of the adjustment element into contact with a surface of the room, such as the ground, thereby creating a friction fit of the lower element between the upper element and the lower element. In some embodiments, this configuration restricts the lower element in at least one degree of freedom. In some embodiments, once one or more lower elements have been secured and/or installed, the item is affixed to one or more mounting components of the lower element, thereby supporting the weight of the item by the assembly. In some embodiments, this affixation restricts the item in at least one degree of freedom. In some embodiments, the method further incorporates use of the various elements and components described herein.

In the foregoing description, certain terms have been used for brevity, clearness and understanding; but no unnecessary limitations are to be implied therefrom beyond the requirements of the prior art, because such terms are used for descriptive purposes and are intended to be broadly construed. Moreover, the description and illustration of the inventions is by way of example, and the scope of the inventions is not limited to the exact details shown or described.

Although the foregoing detailed description of the present invention has been described by reference to an exemplary embodiment, and the best mode contemplated for carrying out the present invention has been shown and described, it will be understood that certain changes, modification or variations may be made in embodying the above invention, and in the construction thereof, other than those specifically set forth herein, may be achieved by those skilled in the art without departing from the spirit and scope of the invention, and that such changes, modification or variations are to be considered as being within the overall scope of the present invention. Therefore, it is contemplated to cover the present invention and any and all changes, modifications, variations, or equivalents that fall with in the true spirit and scope of the underlying principles disclosed and claimed herein. Consequently, the scope of the present invention is intended to be limited only by the attached claims, all matter contained in the above description and shown in the accompanying drawings shall be interpreted as illustrative and not in a limiting sense.

Having now described the features, discoveries and principles of the invention, the manner in which the invention is constructed and used, the characteristics of the construction, and advantageous, new and useful results obtained; the new and useful structures, devices, elements, arrangements, parts and combinations, are set forth in the appended claims.

It is also to be understood that the following claims are intended to cover all of the generic and specific features of the invention herein described, and all statements of the scope of the invention which, as a matter of language, might be said to fall therebetween.

What is claimed is:

1. A post and rail assembly, the assembly comprising:
   an upper element, the upper element comprising:
      one or more lengthwise components, wherein at least one of the lengthwise components is a wing component; and
      a base component;
   a lower element, the lower element comprising:
      a main body comprising an elongate structure, the main body having a top portion, a bottom portion, and a receiving portion, the receiving portion comprising one or more mounting elements positioned along a centerline of the receiving portion;
      a coupling component configured to selectively couple the lower element to the upper element; and
      an adjustment component configured to selectively adjust a length of the lower element;
   wherein the wing component includes a vertical member and a horizontal member.

2. The assembly of claim 1, wherein the base component includes a plurality of receiving elements positioned along a centerline of a first surface of the base element.

3. The assembly of claim 2, wherein the vertical member of the wing component and the first surface of the base element defines a track.

4. The assembly of claim 3, wherein each of the plurality of receiving elements being configured to selectively couple the lower element to the track.

5. The assembly of claim 4, wherein the coupling of the lower element to the upper element restricts the lower element in a plurality of the six degrees of freedom.

6. The assembly of claim 5, wherein the upper element is integrated within a ceiling of building.

7. The assembly of claim 1, wherein each said mounting element is configured to receive and retain at least a portion of an attachment element.

8. The assembly of claim 7, wherein the attachment element includes a first portion and a second portion, the first portion being received and retained by the mounting element, the second portion being connected to the first portion by an intermediary portion, the first, second, and intermediary portion defining a slot.

9. The assembly of claim 8, wherein said slot interfaces with a wall of the lower element while the attachment element is received and retained.

10. A method of securing an item for display, the method comprising:
    securing an upper element to a surface of a room;
    securing a portion of at least one lower element to the upper element;
    adjusting the lower element from a retracted to an extended configuration, such that a foot of the adjustment element extends into contact with a surface of the room; and
    affixing an item to one or more mounting element of the lower element;
    wherein the upper element comprises one or more lengthwise components, at least one of the lengthwise components being a wing component, and a base component; and
    wherein the wing component includes a vertical member and a horizontal member.

11. The method of claim 10, wherein the lower element comprises an elongate main body with a plurality of mounting elements positioned along a centerline of the elongate main body.

12. The method of claim 11, wherein adjusting the lower element further results in restricting the lower element in six degrees of freedom respective to the upper element.

13. The method of claim 11, further comprising the step of receiving and retaining at least a portion of an attachment element within at least one of the plurality of mounting elements.

14. The method of claim 13, wherein each attachment element comprises a first portion and a second portion, the first portion being received and retained by the mounting element, the second portion being connected to the first portion by an intermediary portion, the first, second, and intermediary portion defining a slot, and wherein the slot interfaces with a wall of the lower element while the attachment element is received and retained.

15. The method of claim 14, further comprising: securing a portion of a second lower element to the upper element, adjusting the second lower element from a retracted to an extended configuration, such that a foot of the adjustment element extends into contact with a surface of the room, and further affixing said item to one or more mounting element of the second lower element.

16. A system for securing an item, the system comprising:
    two vertical elements separated by a first distance, each vertical element with a plurality of mounting elements;
    a plurality of attachment elements, each attachment element including a first portion and a second portion, the first portion being received and retained by at least one or the plurality of mounting elements, the second portion being connected to the first portion by an intermediary portion, the first, second, and intermediary portion defining a slot;
    wherein said two vertical elements are each connected to an upper element comprising one or more lengthwise components, at least one of the lengthwise components being a wing component, and a base component; and
    wherein the wing component includes a vertical member and a horizontal member.

17. The system of claim 16, wherein the second portion of each attachment element selectively couples to an item.

18. The system of claim 17, wherein each vertical element further includes a coupling element and an adjustment mechanism, the coupling element and the adjustment mechanism working in tandem to securing the vertical element in a vertical orientation within a room and restricting the vertical element in six degrees of freedom, and wherein the item is secured against both vertical elements by the said plurality of attachment elements.

\* \* \* \* \*